July 15, 1952　　　R. B. WILSON　　　2,603,536
WIRE DRAWN BRUSH MACHINE

Filed May 27, 1948　　　12 Sheets-Sheet 1

FIG.1

INVENTOR
RICHARD B WILSON
BY
Chapin & Neal
ATTORNEYS

July 15, 1952　　　　　R. B. WILSON　　　　2,603,536
WIRE DRAWN BRUSH MACHINE

Filed May 27, 1948　　　　　　　　　　　12 Sheets-Sheet 3

INVENTOR
RICHARD B WILSON
BY
Chapin & Neal
ATTORNEYS

July 15, 1952

R. B. WILSON 2,603,536

WIRE DRAWN BRUSH MACHINE

Filed May 27, 1948

INVENTOR
RICHARD B WILSON
BY
Chapin & Neal
ATTORNEYS

July 15, 1952　　　R. B. WILSON　　　2,603,536
WIRE DRAWN BRUSH MACHINE

Filed May 27, 1948　　　　　　　　　　12 Sheets-Sheet 5

FIG. 5　　　FIG. 6

INVENTOR
RICHARD B WILSON
BY Chapin & Neal
ATTORNEYS

July 15, 1952 R. B. WILSON 2,603,536
WIRE DRAWN BRUSH MACHINE

Filed May 27, 1948 12 Sheets—Sheet 6

FIG. 7

INVENTOR
RICHARD B WILSON
BY
Chapin & Neal
ATTORNEYS

July 15, 1952 R. B. WILSON 2,603,536
WIRE DRAWN BRUSH MACHINE
Filed May 27, 1948 12 Sheets-Sheet 7

INVENTOR
RICHARD B WILSON
BY
Chapin & Neal
ATTORNEYS

July 15, 1952 R. B. WILSON 2,603,536
WIRE DRAWN BRUSH MACHINE
Filed May 27, 1948 12 Sheets-Sheet 9

INVENTOR
RICHARD B. WILSON
BY
Chapin & Neal
ATTORNEYS

July 15, 1952 R. B. WILSON 2,603,536
WIRE DRAWN BRUSH MACHINE
Filed May 27, 1948 12 Sheets-Sheet 10

INVENTOR
RICHARD B WILSON
BY
Chapin & Neal
ATTORNEYS

Patented July 15, 1952

2,603,536

UNITED STATES PATENT OFFICE 2,603,536

WIRE DRAWN BRUSH MACHINE

Richard B. Wilson, Springfield, Mass., assignor to Better Brushes, Inc., Palmer, Mass., a corporation of Massachusetts Application May 27, 1948, Serial No. 29,478

10 Claims. (Cl. 300—6)

This invention relates to improvements in brush making machines, and the purpose of the improvements is to provide a new machine adapted to set tufts of bristles in a brush back to make, in a new way, a particular kind of brush which will be described.

Routine brush making machines are of the so-called "stapling" type in which a small piece is cut from a metal strip, and, when the middle of a bundle of bristles is positioned over the face of a hole, this small piece or "staple," which is only slightly longer than the diameter of the hole, is forced down on top of the bristle "bridge" to drive it into the hole as the "staple" is wedged in behind it. In this manner a tuft of bristles is formed and anchored on the brush back.

Instead of using such "staples" or other small cut pieces of metal, the new machine of the invention uses only a single binder thread, such as wire, to secure all the tufts in an entire brush and make a type of brush which is usually made by hand. The operation is substantially automatic, involving coordinated details which will need to be explained by reference to the accompanying drawings for a clear understanding of the structure and mode of operation.

In the drawings,

Figs. 5 and 6 are edge and plan views respectively of a prefererd brush back;

The machine shown in the drawings is for making what is known as a wire drawn brush. It is the type of well-known brush in which all the tufts are held in holes extending through the brush back by one continuous binding wire. This wire has a loop formed in it at each hole. The bristles of each tuft extend through the loop of each hole so that when the wire is drawn tightly all the bristles are held in their holes by the one wire and without other binding means. This type of brush is of high quality and is usually made by hand. The purpose of the machine is to make such brushes in what is substantially a full automatic machine operation and the features of invention involved will appear from the description and be pointed out in the claims.

Figure 1:
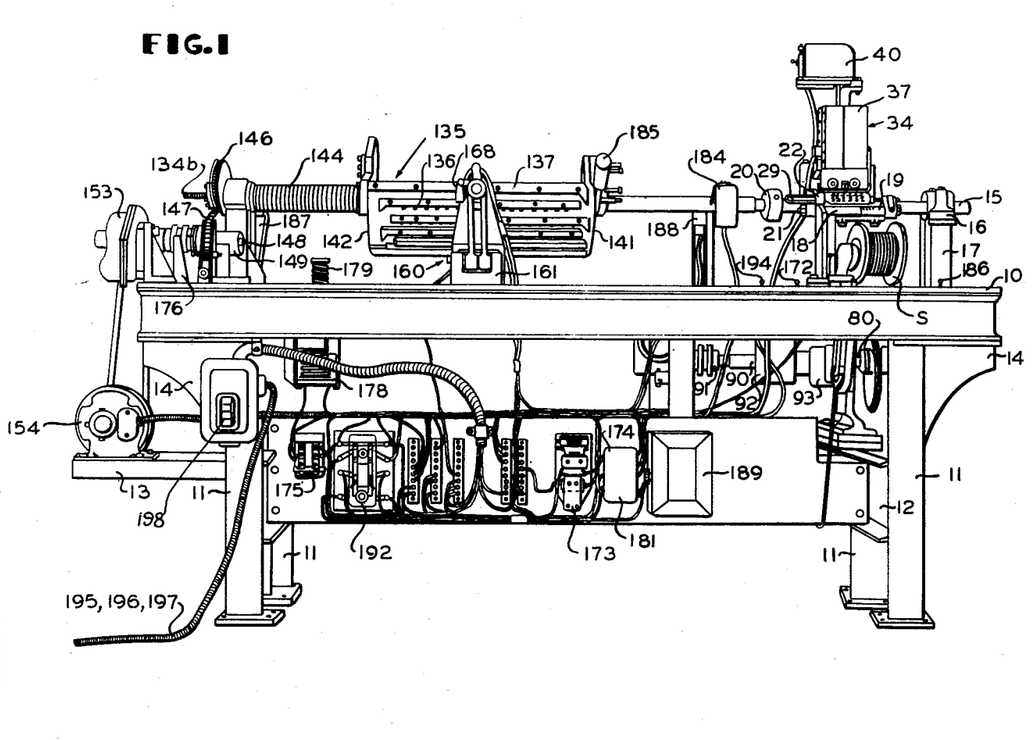
Fig. 1 is a pictorial front elevational view of the new machine.

As shown in Fig. 1, the framework of the machine consists of table or deck 10, its legs 11, cross members 12, motor platform 13 and fillet brace plates 14.

On and at one end of this framework, as a part of the super-structure above deck 10, is a stationary shaft 15 supported by clamp 16 and clamp stand 17.

Figure 2:
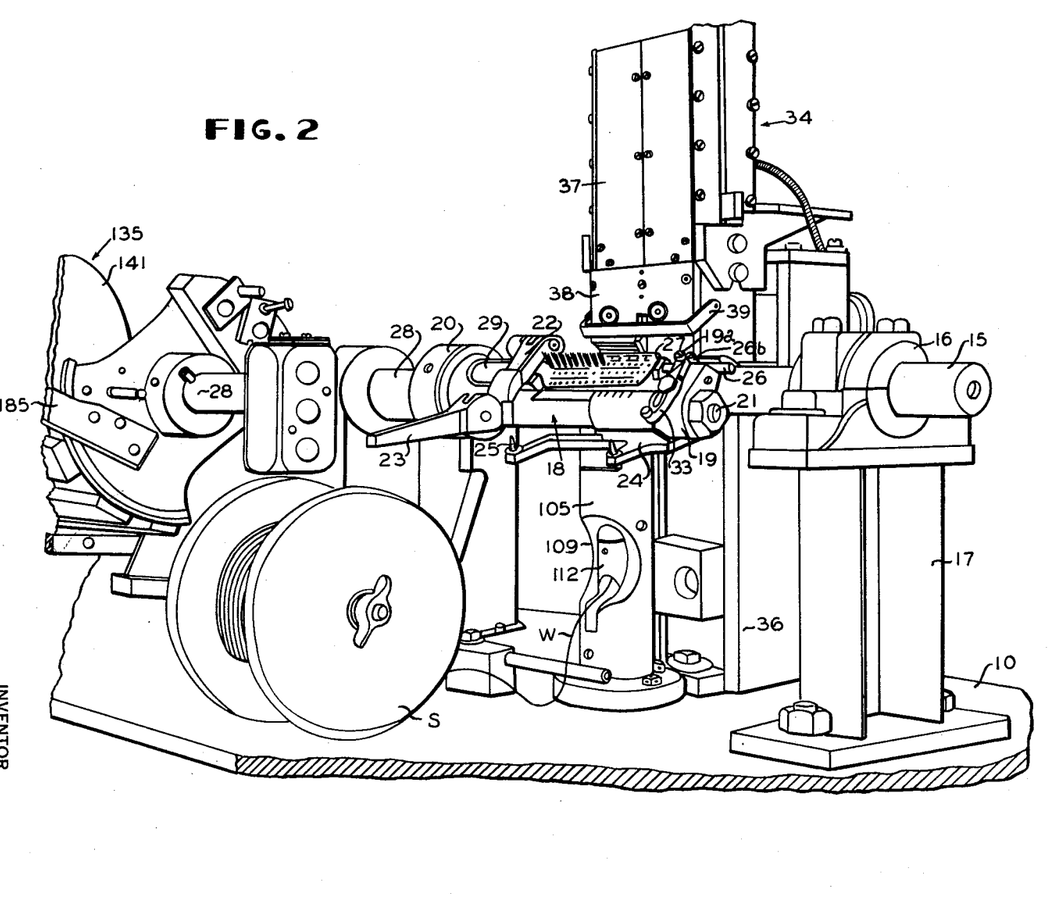
Fig. 2 is a similar but enlarged view of its stitching end.

This shaft 15 supports a clamping assembly 18 adapted to hold a single brush back. Brush back clamping assembly 18 (Fig. 2) is slidable and partially rotatable on stationary shaft 15 and has a tail stock 19 which fits over the shaft. Tail stock 19 is tied to a head stock 20 by a register shaft 21. The head stock supports a main clamp 22. Main clamp 22 is held down in clamping position by lever operated cam 23. Shaft 21 supports a registering device 24, rotatable on it. Pins 25 are provided on registering device 24 to correctly align the brush back within the clamp in a manner later to be described. Tail stock 19 carries a small slidable shaft 26 on one end of which are two fine points 27 (Fig. 4) adapted to be driven and held by a spring 26a into one end of the brush back to support and secure it rigidly within the clamping device. A wedge 33 is adapted to slide on the tail stock 19 and wedge pin 26b on shaft 26 (Fig. 4) away from stationary pin 19a on the tail stock so that spring 26a is compressed and fine points 27 moved to the right of the position indicated in Fig. 4. Head stock 20, which is set-screwed onto the end of the machine's main shaft 28 (Fig. 2), is rotatable and slidable and supported in a manner to be explained.

Figure 5:
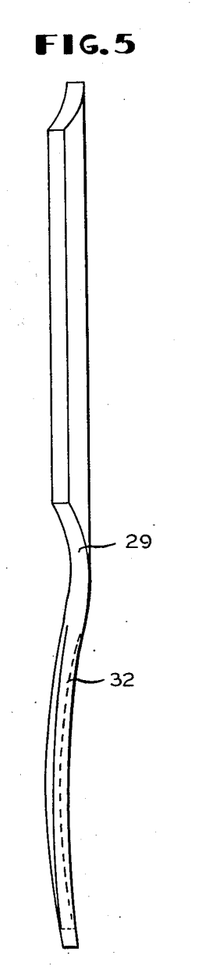
Figure 6:
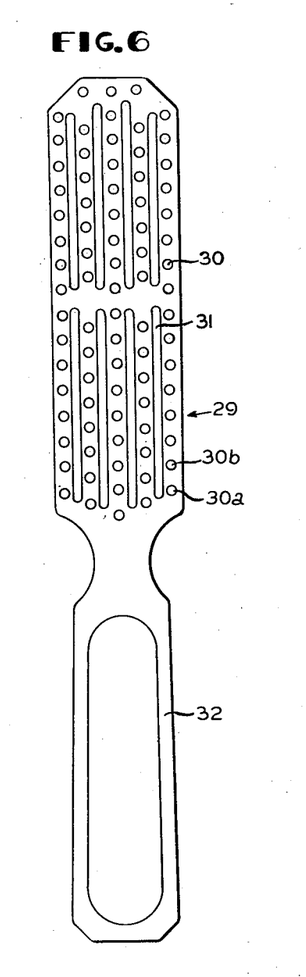

Clamping assembly 18 is adapted to receive a brush back 29 (Fig. 5, Fig. 6), pierced all the way through the back by holes 30 and by elongated slots 31, which slots materially aid in keeping the brush clean as does the curvature of the brush back. The elongated slots, however, are not necessary to the functioning of the machine. The rear side of the brush back is grooved with recesses (not shown) around its periphery and along the hole lines. The handle portion 32 of the brush back 29 may be curved as shown (Fig. 5) to provide a comfortable grip.

A brush back 29 (Fig. 2) is inserted in the machine in the following manner. Wedge 33 (Fig. 4) is moved upward to wedge pin 26b on shaft 26 away from stationary pin 19a on the tail stock and move the fine points 27 to the right of the position indicated in Figs. 2 and 4. Spring 26a is, of course, compressed in doing so. Main clamp 22 (Fig. 2) is then lifted so the handle of the brush back 29 can be inserted underneath it. Main clamp 22 is so positioned as to bear upon the throat of the handle. Registering device 24 is then manually pivoted about the sleeve indicated on shaft 21 and pins 25 are inserted into two of the holes in the brush back to correctly align the latter in the clamping device. Lever operated cam 23 is then pivoted into place above main clamp 22 and rotated to bring pressure to bear upon the end of the main clamp.

With registering device 24 still in position, the wedge held slidable shaft 26 is released by pulling down wedge 33, and fine points 27 are urged by spring 26a against the end of the brush back. Registering device 24 is then withdrawn or a spring (not shown) may be provided to rotate it back out of the way once the operator stops holding it in position.

Figure 8:
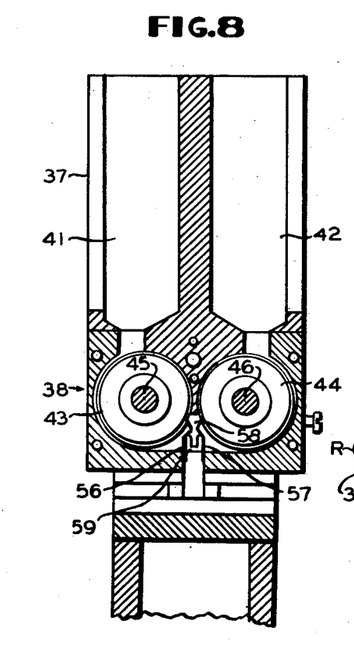
Fig. 8 is a vertical cross sectional view of the bristle magazine and related feed mechanism.
Figure 9:
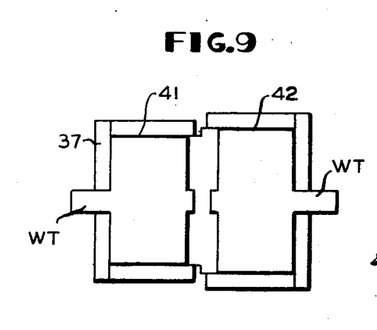
Fig. 9 is a top plan view of Fig. 8 but additionally showing bristle holding weights.
Figures 10, 18:
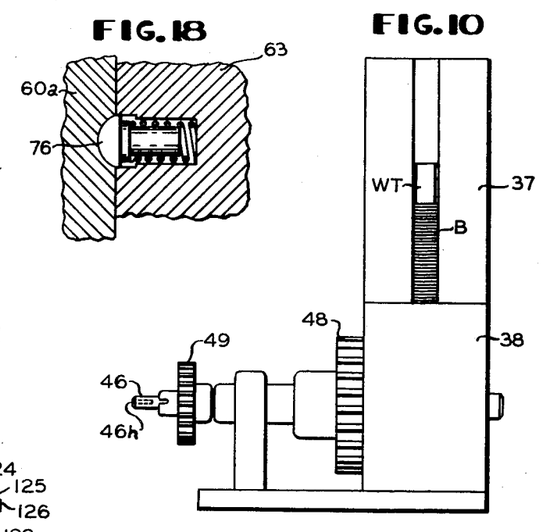
Fig. 10 is a side elevational view of the magazine and related feed drive mechanism.
Fig. 18 is a cross section of a portion of one of the runners of the element shown in Fig. 17 and of an associated spring detent button device disposed in its "way"
Figure 11:
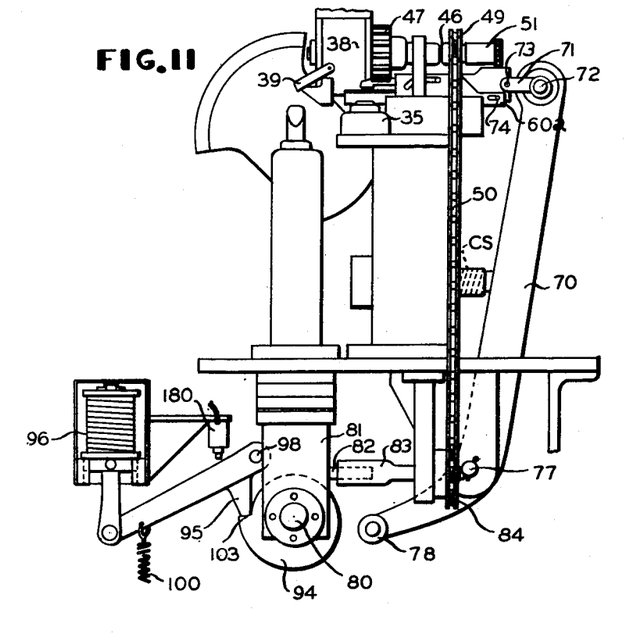
Fig. 11 is an end elevation of the stitching end of the machine with some parts omitted for purposes of clarity.
Figure 12:
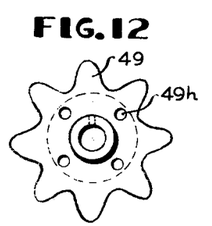
Fig. 12 is an end view of the feed mechanism drive sprocket.
Figure 13:
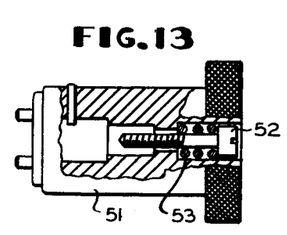
Fig. 13 is an elevation partly in section, of a retractable handle device driven by the sprocket.

A bristle feed assembly 34 (Fig. 2) is mounted on three resilient cushions 35 (Fig. 7) arranged as a "three point" support (only one of which is visible in Fig. 7) atop elevated stand 36 (Fig. 7) which rests on deck 10 of the machine. Assembly 34 (Fig. 2) includes magazine 37 and a magazine feed roll assembly enclosed within box structure 38. On the front end of box structure 38 is appended pivotally operated bristle catcher 39, the operation of which will be later explained. Above assembly 34 is mounted an electrically operated vibrator 40 (Figs. 1 and 7) adapted to give vibrations of small vertical amplitude to the resiliently mounted assembly 34. Magazine 37 contains two supply chutes 41 and 42 (Fig. 8) so that bristles B (not shown in this figure, see Fig. 10) of two different lengths, one length from each chute, may be included in each tuft of bristle in the brush product. Weights WT (Figs. 9 and 10) may be provided to hold down the loose cut lengths of bristles, one length being in each chute 41 and 42. Box structure 38 (Fig. 8), contains two magazine cylinders 43 and 44 which are firmly fixed to shafts 45 and 46 and rotate therewith. These shafts carry uniform meshing gears 47 and 48 (Fig. 7) which are driven through a drive sprocket 49 (Figs. 10 and 11) on shaft 46, but not keyed to it. Sprocket 49 is driven by chain 50 (Fig. 11). On the exterior face of sprocket 49 (Fig. 12) are spaced holes 49h adapted to receive engaging prongs on a slidable handle 51 (Fig. 13) which is attached to shaft 46 (Fig. 10) as by the screw 52 shown in Fig. 13. The prongs on the handle are normally held in the sprocket holes by pressure from spring 53. But if desired, handle 51 may be manually retracted to disengage the prongs from the sprocket. Shaft 46 may then be manually rotated. It is normally rotated by sprocket 49 driving through said prongs on handle 51, the handle illustrated being attached to shaft 46 (Figs. 10 and 13) by screw 52 which screws into a tapped and threaded hole 46h (Fig. 10) in the end of shaft 46.

Figure 14:
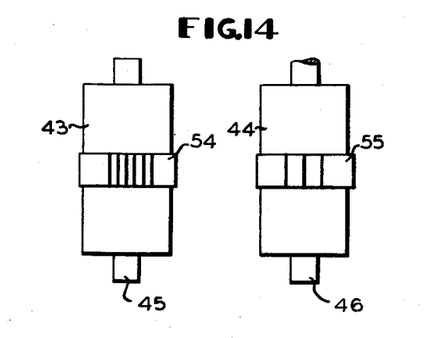
Fig. 14 is a plan view of the two bristle feed rollers.

To pick a predetermined number of bristles from the bristle holding magazine, cylinders 43 and 44 (Fig. 8) are provided with raised band portions 54 and 55 (Fig. 14). In these raised portions are transverse grooves of a size adapted to receive one bristle only in a groove. Any number of grooves may be provided to a cylinder. In the present example six short bristles are picked from one compartment of the magazine and three long bristles from the adjoining compartment. Therefore in Fig. 14 six grooves are indicated on cylinder 43 and three grooves on cylinder 44. It is of course understood that any number of such grouping could be provided on the cylinders, a convenient arrangement being to have four groups of the six grooves on cylinder 43 spaced 90° apart, and four groups of the three grooves on cylinder 44 spaced at the same angle. The drive can then be synchronized to revolve these cylinders 90° for each knot or group of bristles for each tuft to be inserted and stitched in each hole of the brush back.

Figures 15, 16:
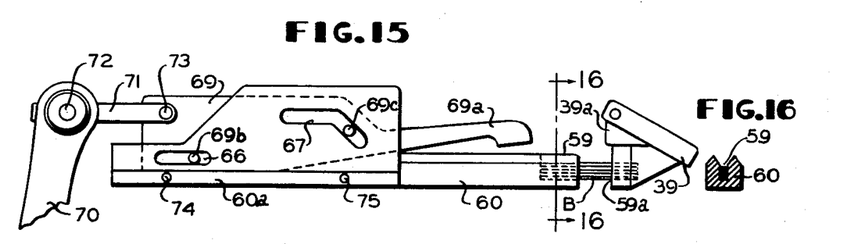
Fig. 15 is an elevation of the bristle clamping and feed device.
Fig. 16 is a cross section taken on line 16—16 of Fig. 15.
Figure 17:
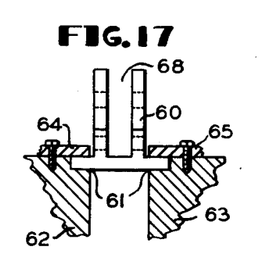
Fig. 17 is a rear view of an element of the bristle clamping and feed device.

Bearing against the cylinders are doctor blades 56 and 57 (Fig. 8) which are so arranged as to enforce the removal of bristles from the notches in the cylinders as the cylinders are revolved, and the bristles fall by gravity through passageway 58 into notch 59 (Figs. 15 and 16) that exists within clamp slide 60, one end of the bristles being supported in this notch and the other end of the bristles being supported in notch 59a (Fig. 15) in the pivotally operated bristle catcher 39. Bristles B bridge across the gap between these two supports. Bristle catcher 39 is adapted to be raised after the bristles are firmly clamped and held in notch 59 of the clamp slide 60 as will later be fully explained. Clamp slide 60 is horizontally slidable in ways 61 (Fig. 17) cut in supporting blocks 62 and 63. Two hold-down plates 64 and 65 hold the slide 60 within the ways. In the rearward portion of slide 60 are disposed two cam slots 66 and 67 (Fig. 15). There is a central channel 68 (Fig. 17) throughout the full length of clamp slide 60 and within this central channel slides a clamp member 69 (Fig. 15). Clamp member 69 has protruding pins 69b and 69c that run within cam slots 66 and 67 in clamp slide 60 so that upon being urged forward clamp member 69 first moves in a substantially horizontal plane so that the front tongue of this member 69a moves out over bristles B that have fallen into notches 59 and 59a, then moves down to clamp the bristles in notch 59. Clamp member 69 is linked to cam follower arm 70 through link 71, pivoted at 72 and 73. Clamp slide 60 has machined into its edge 60a, which runs in a way of block 63, two notches 74 and 75 (Fig. 15) against which edge bears a spring biased detent button 76 (Fig. 18) disposed within way block 63. The effect of this detent button 76 is to let clamp member 69 move forward to clamping position upon initial motion of cam follower arm 70 but to hold slide 60 stationary until firm clamping is obtained. Cam follower arm 70 is moved by a cam follower 78 (Fig. 11) which bears against a cam 79 (Fig. 4) as will be explained. As cam follower arm 70 (Fig. 15) continues to move forward, clamp slide 60 is picked up (when pins 69b and 69c go to the ends of their slots) and also moves forward so that bristles B held within notch 59 are inserted, horizontally, through a wire loop L (Fig. 19) formed above a hole in the brush back in a manner later to be described. After inserting the bristles through the wire loop, cam follower arm 70 (Fig. 15) starts upon its return stroke. The tongue 69a of member 69 raises during the initial movement of the cam follower arm 70 when the arm starts its return stroke. At the forward position of clamp slide 60 detent button 76, which was cammed out of notch 75 when the slide moved forward, has dropped into notch 74 thus encouraging clamp slide 60 to remain in the forward position until pins 69b and 69c reach the rear ends of their slots at which time clamp 69 has been fully retracted within clamp slide 60. Then the clamp slide assembly is returned to the bristle charging position corresponding to the limit of back stroke of cam follower arm 70 in which position detent button 76 slips back into notch 75.

In moving forward the bristles B (Fig. 15) after they have been firmly clamped in the notch 59 of clamp slide 60 by the tongue 69a of member 69, the pivotally operated bristle catcher 39, the notch 59a of which serves as a support for one end of the bristles before they are securely clamped in notch 59, must be raised out of the way. To do this, bristle catcher 39 has been provided with a projection 39a (Figs. 19 and 20) on one side arm which projection acts as a cam surface to move the bristle catcher upward to the position shown in Fig. 19 when rod R, attached to and reciprocating with clamp slide 60, moves forward with the slide. In this position the tongue 69a has bristles B securely clamped in the notch 59 and has horizontally inserted the bristles through wire loop L, formed above brush back 29.

Figure 7:
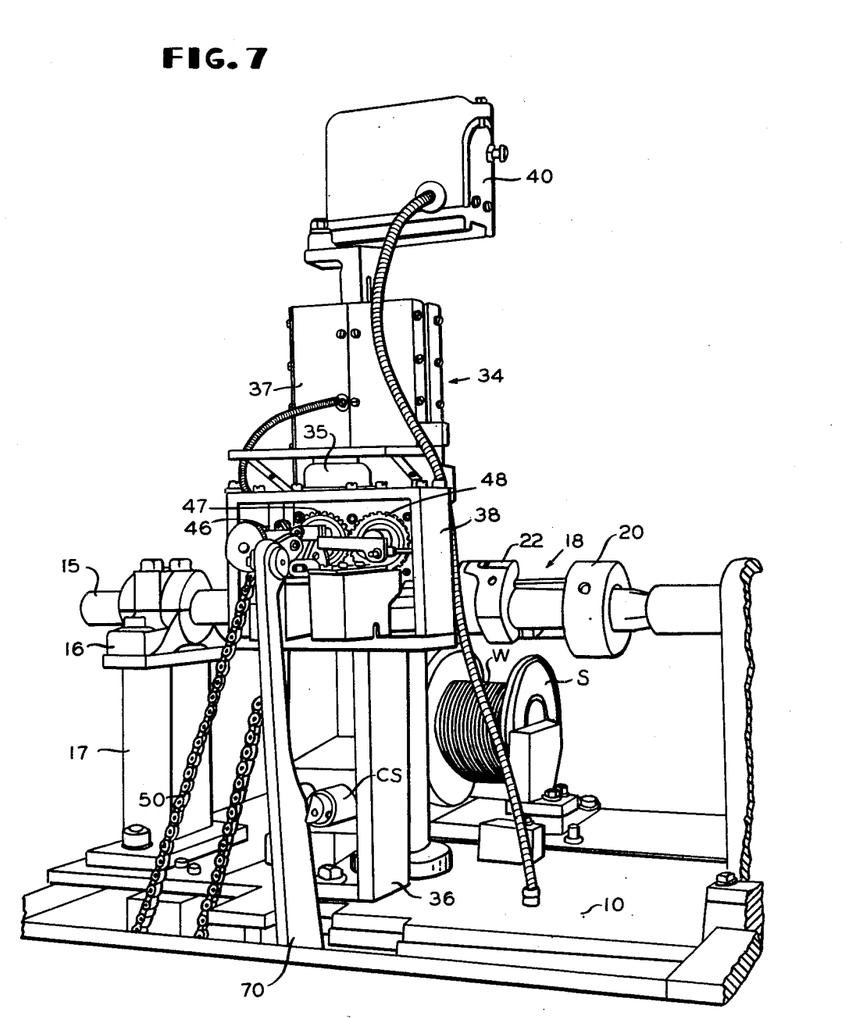
Fig. 7 is a rear view of the stitching end shown in Fig. 2.

Cam follower arm 70 is substantially a bell crank pivoted about pivot 77 (Fig. 11). The lower portion of this bell crank carries cam follower 78 which bears against the cam 79 seen in Fig. 4. Cam follower arm 70 is always urged to a rear position by compression spring assembly CS (Figs. 7 and 11). Profile cam 79 (Fig. 4) is keyed on shaft 80 which drives worm gear speed reducer 81. The low speed shaft 82 (Fig. 11) of speed reducer 81 connects by a coupling with shaft 83 on the end of which is a sprocket 84. Sprocket 84 drives chain 50 which in turn drives sprocket 49 for the bristle feeder means above described.

Figure 4:
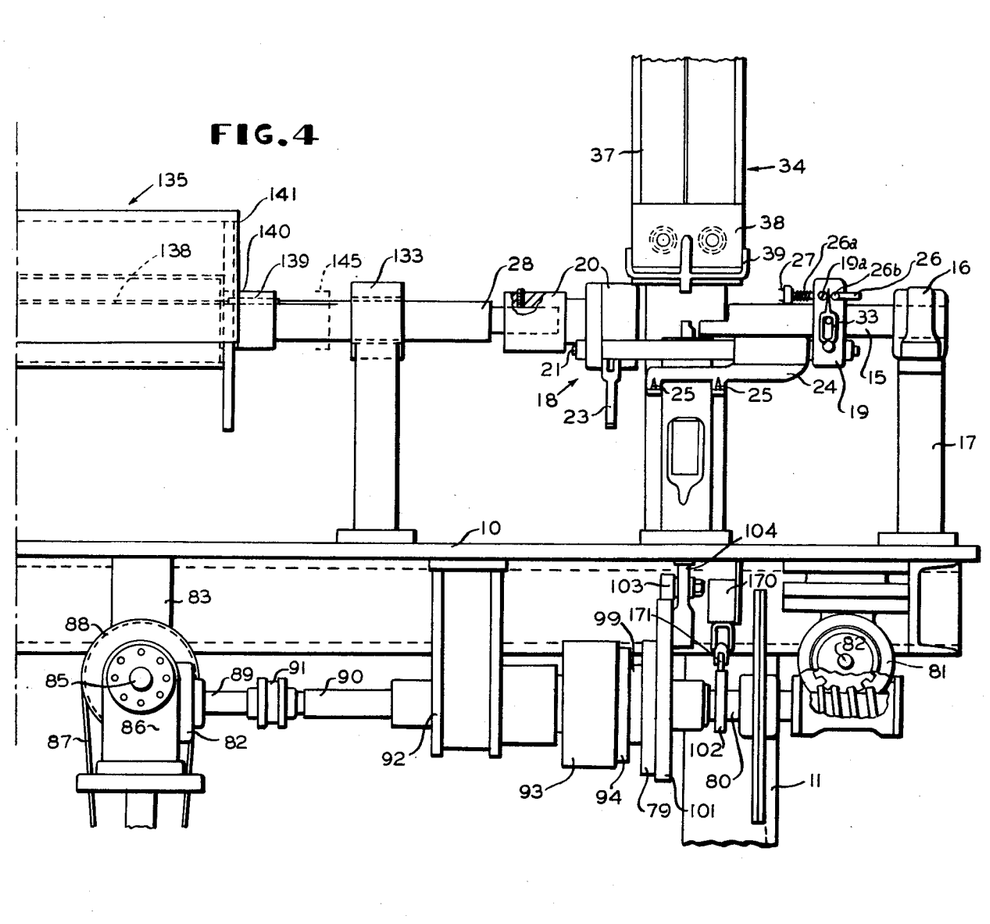

A motor (not shown) drives worm shaft 85 (Fig. 4) of worm gear speed reducer 86, as by belt 87 and pulley 88 shown, to drive the low speed shaft 89 at a relatively slow velocity. Shaft 89 is connected with a shaft 90 by coupling 91. Shaft 90 is supported by bearing hanger 92 suspended from deck 10. Shaft 90 is also fastened to a one-revolution clutch 93, having a control cam 94 which is normally engaged by pawl 95 (Fig. 11). Pawl 95 is linked to a solenoid 96 and is pivoted on fixed pin 98 so that on energizing the solenoid, the pawl is lifted against the tension of a spring 100 to allow control cam 94 to engage the inner mechanism of the clutch and drive clutch hub 99 (Fig. 4). Hub 99 is keyed to shaft 80 on which is also mounted a needle drive cam 101, bristle slide cam 79, indexing signal cam 102, and the worm gear of worm gear speed reducer 81 referred to above.

Solenoid 96 (Fig. 11) is deenergized as will be described, after notch 103 of control cam 94 passes by the lifted pawl 95. After the clutch functions as a unit to drive shaft 80 for one revolution, the pawl 95 reengages the notch and disconnects the clutch in the usual manner of a one-revolution clutch.

A cam follower 103 (Fig. 4) is fastened to a vertical needle holding reciprocating shaft 104 (Fig. 21) which reciprocates one complete stroke for each revolution of needle drive cam 101, cam 101 being carried through one complete revolution for every stitch of the machine.

*Wire handling means*

Shaft 104 reciprocates in hollow needle post 105 (Figs. 21 and 22) fixed to and resting on deck 10. A slot 106 (Fig. 21) in shaft 104 and a pin 107 passing through the post 105 and the slot, helps keep the shaft 104 in proper alignment. Shaft 104 has a hollow threaded extension 108, the wall of which is partly cut away to permit access to the hollow portion through opening 109. A further extension 110 of shaft 104 contains needle holding member 111 through which passes hollow needle 112. Compression bearing clamps 113 and nuts 114 clamp the needle to the holding member 111 so that the needle moves with reciprocating shaft 104.

The upper end of the needle 112 is reduced in diameter for passage through small drilled hole 115 in needle post cap 116, and the lower end of the hollow needle 112 has its wall cut away on one side for a short distance for wire W (Figs. 2 and 24) to be easily threaded through. The needle never rises above the top of post cap 116 (Fig. 21) but slides within the cap. As stated above, this needle is hollow and the wire W passes through it axially as indicated in Fig. 24.

Figures 21, 23, 24:
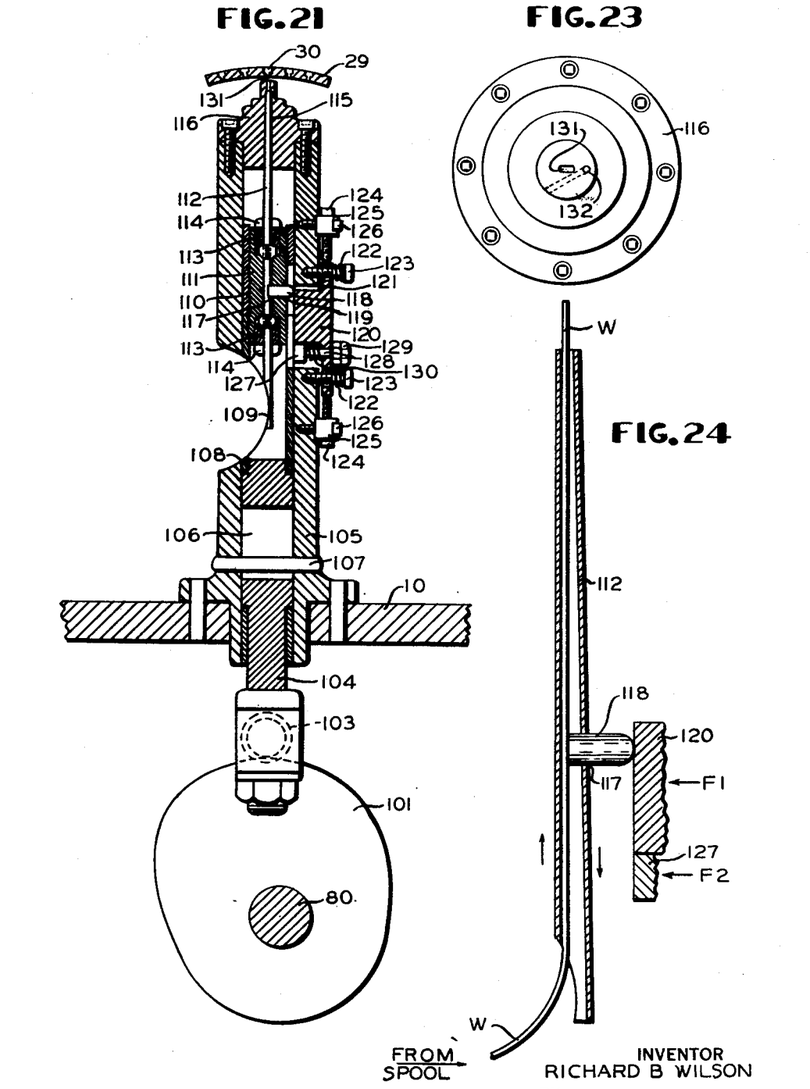
Fig. 21 is a vertical cross section of the needle drive post and wire stitching mechanism.
Fig. 23 is a plan view of the top of the needle post cap.
Fig. 24 is a diagrammatic view of the needle threaded and at the top of its stroke.
Figure 22:
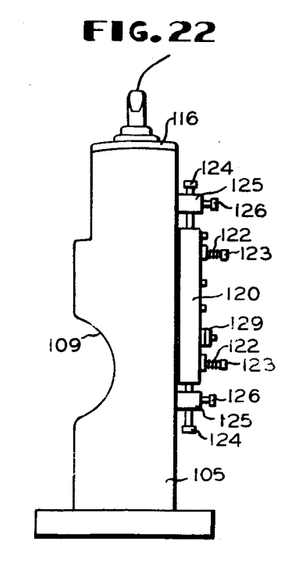
Fig. 22 is an elevation of the post shown in Fig. 21.

In the side of needle 112 is an open notch 117 into which projects pinch button member 118 to pinch the wire in the needle (Fig. 24). This member 118 is also slidable laterally in an opening 119 in holding member 111. Notch 117 is cut so that the bore of the hollow needle 112 is exposed. When the hollow needle 112 is threaded by passing wire W (Fig. 24) axially through its bore, one end of button 118 bears against the wire to restrict any relative movement of the wire in the needle.

As one end of pinch button 118 is bearing against the strand of wire in the needle, when the needle is at the top of its stroke as shown in Fig. 24, the other end bears against clamp slide 120 which is yieldably held within slot 121 (Fig. 21) in needle post 105 by springs 122 held by screws 123. Screws 124 through blocks 125, held to needle post 105 by screws 126, provide vertical adjustments of the position of clamp slide 120 (also see Fig. 22).

A small block 127 is attached to a pin 128 which passes through clamp slide 120 and has terminal nuts 129. Block 127 is urged forward by spring 130 and terminal nuts 129 are adjusted so that the face of the block is flush with the face of clamp slide 120 along which the pinch button travels and bears.

In the stitching operation, the cam surface of cam 101 causes shaft 104 to rise its full stroke during approximately the first 75° of revolution of shaft 80. At the bottom of the stroke, pinch button 118 bears against block 127 and exerts relatively little pressure against the wire passing up through the needle, but during the rise of the needle, the button slides up along the face of slide clamp 120 and pinches the wire hard enough so that the wire is forced to move with the needle and to be fed up through slotted exit orifice 131 in needle post cap 116. Prior to starting the machine, the operator threads wire W (Fig. 2) from spool S up through the needle (Fig. 24) and out the exit orifice 131 (Fig. 23) in needle post cap 116, and, prior to "stitching" bristles in each brush, feeds the loose end of wire through hole 132 (Fig. 23) for a short length and pulls it taut across the top of the stationary post cap, the short length of wire projecting from the exit of hole 132 in the side of the post cap being bent down the side of the post cap and post to anchor this loose end of wire. Friction of the wire in hole 132, the sharpness of the bends in the wire at the entrance and exit of hole 132, the length of wire pulled through hole 132 and the angle at which the wire is pulled by the downstroke of the needle or by the direction of the movements of the brush back all prevent this "free" end of wire from being drawn into and through the holes in the brush back. When this end of wire is so anchored, the needle forces the portion of wire between the top of the needle and the top of the post cap up through slotted exit orifice 131 and causes a loop to form on the top of the post cap and forces this loop through the hole 30 (Fig. 21) in the brush back 29. Holes 30 are preferably shaped as the one shown in Fig. 21. At the top of the needle stroke, the loop reaches its maximum size above the brush back and bristles are caused to be inserted by the contour of cam 79 (Fig. 4) as has been described. Shaft 104 drops to the bottom of its stroke after approximately 180° of revolution of shaft 80 and has no motion during the shaft's remaining half-revolution.

At the start of the needle stroke, the pressure exerted by spring biased block 127 on button 118 is enough for the button to pinch the wire sufficiently to prevent it from moving in the needle as the loop begins to form. The wire is more firmly pinched when the button leaves the block 127 and moves up along the face of slide clamp 120. The wire loop is now to be pushed through a hole 30 of the brush back.

In moving upward to form the loop and to insert it through a hole 30 of the brush back the tendency of the wire to slip in the needle increases and the wire must be tightly held against such slippage. As indicated diagrammatically in Fig. 24, a force F1 sufficient to do this is exerted by slide clamp 120 against the pinch button 118 when the button moves up along the face of the slide clamp. As the needle continues to move upward it forces the loop through a hole 30 (Fig. 19) in brush back 29 and increases the size of the loop until the top of the stroke is reached. As has been described, the bristle inserting mechanism is synchronized to insert a bunch of bristles into the loop to half the bristle length. About at this point the downstroke of the needle begins and during the major portion of this downstroke force F1 (Fig. 24) exerted by the slide clamp 120 against the pinch button forces the button to hold the wire tightly enough to tighten the loop (Fig. 19) around the bristles and draw the middle of the bunch inserted into the hole in the brush back to form and anchor a tuft on the brush back.

Provision must be made to release some of the pull on the wire by the needle after the tuft has been firmly seated and anchored in the hole. To do this, spring pressed block 127 is provided which exerts a force F2 (Fig. 24), less than force F1, against the pinch button 118. By this means, the firm pinch on the wire W during the major portion of the downstroke of the needle is released at the proper point, i. e. when button 118 reaches said block, and the needle is thus allowed to move down the taut wire. Spring pressed block 127 thus provides for release of the heavy grip on the wire necessary in the seating of the bristles and permits passage of the wire through the needle to replenish wire permanently left in the base of the hole and the wire used when moving the brush from one hole to the next for consecutively stitching in the bristle tufts.

Figure 19:
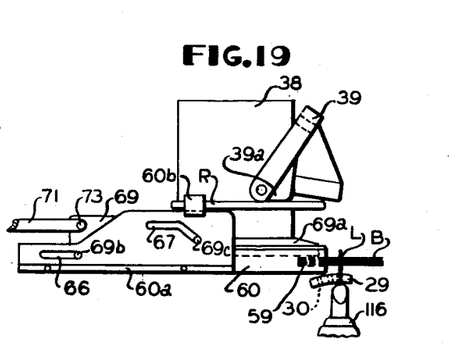
Fig. 19 is a view similar to Fig. 15 but showing the bristle clamping and feed device in its foremost extended position.
Figure 20:
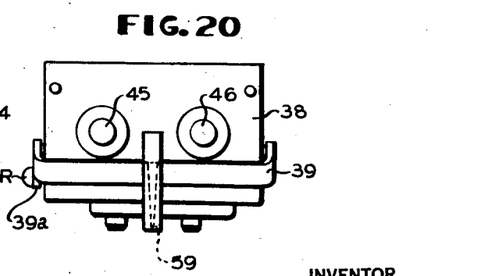
Fig. 20 is a front elevational view of the bristle feed mechanism.

There should preferably be little distance between the brush back 29 (Fig. 19) and the top of the needle post cap 116 so that wire pushed upward by the needle will be doubled through the registering hole in the brush back. In the formation of the loop it has been found very useful to slot the exit orifice 131, as indicated in Fig. 23, to prevent the loop from being formed at other than right angles to the bristles being inserted through it, as indicated in Fig. 19. In the present machine the needle rises almost to the top of the post cap, above which height the bore in the needle cap post 116 (Fig. 23) is narrowed down in a transverse direction and flared out longitudinally so that wire passes through a slotted exit orifice of cap post 116. The slot may be approximately .090 by .015 inch.

After the needle has reached the bottom of its stroke the brush back clamping assembly is moved by indexing mechanism to be described so that another hole 30 in the brush back 29 is in register with the exit orifice 131 (Fig. 23) in the needle post 116 and the needle reciprocates again to form another loop and pull this loop tight about the bristles which are inserted through it to form another tuft on the brush, repeating the operation until a row of holes (Fig. 6) in brush back 29 have been stitched. The brush back clamping assembly is then partially rotated by the indexing mechanism to be described and another row of holes are "stitched."

Having the exit orifice 131 (Fig. 23) in post cap 116 slotted is particularly useful when it is necessary for the continuous length of wire, which is drawn over the back of the brush as the tufts are stitched, to pass from one row of holes to the next. When the wire is forced up the loop is encouraged to form and square itself to the direction of insertion of the bristles.

*Indexing mechanism*

Brush back 29 (Fig. 2) is initially positioned in the clamp 22 so that hole 30a (Fig. 6) is above and registers with slotted exit orifice 131 (Fig.

21) in needle post cap 116, but after stitching a tuft of bristles in this hole the brush back is moved by the machine to bring the next hole 30b (Fig. 6) in registration with the exit orifice. In addition to this movement, the brush back is rotated on completion of one row of holes stitched to start another row. This is done by the following mechanism.

Figure 3:
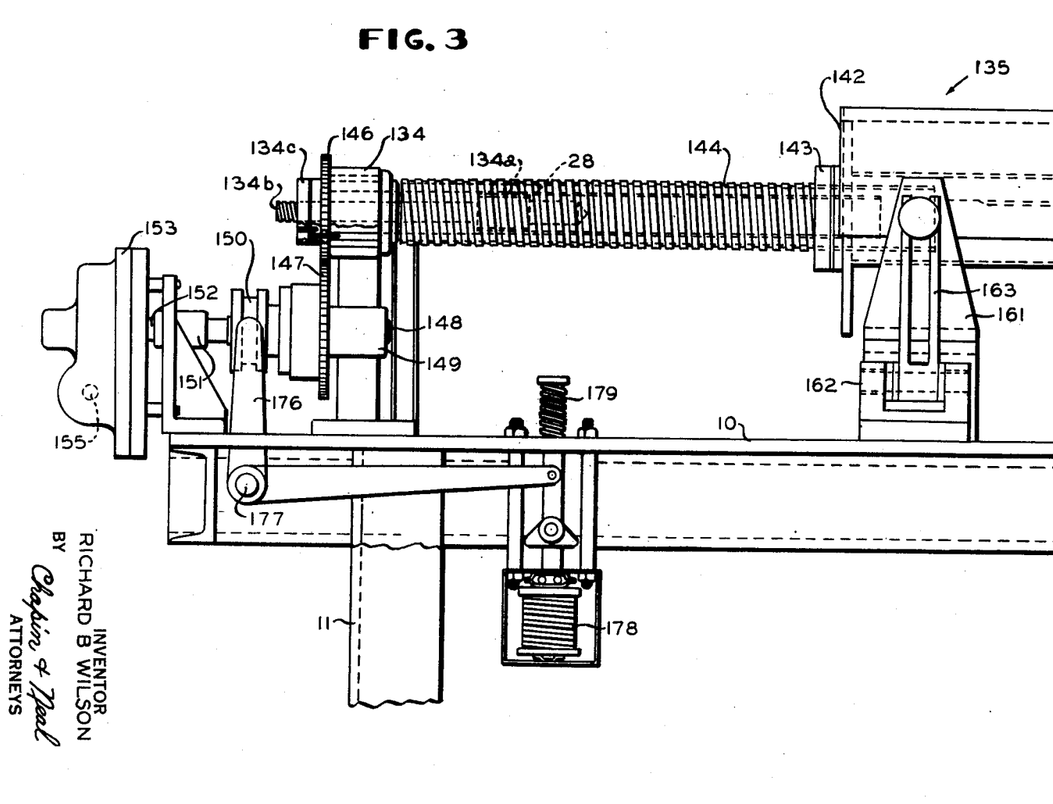
Figs. 3 and 4 combine to form a front elevational view.
Figure 25:
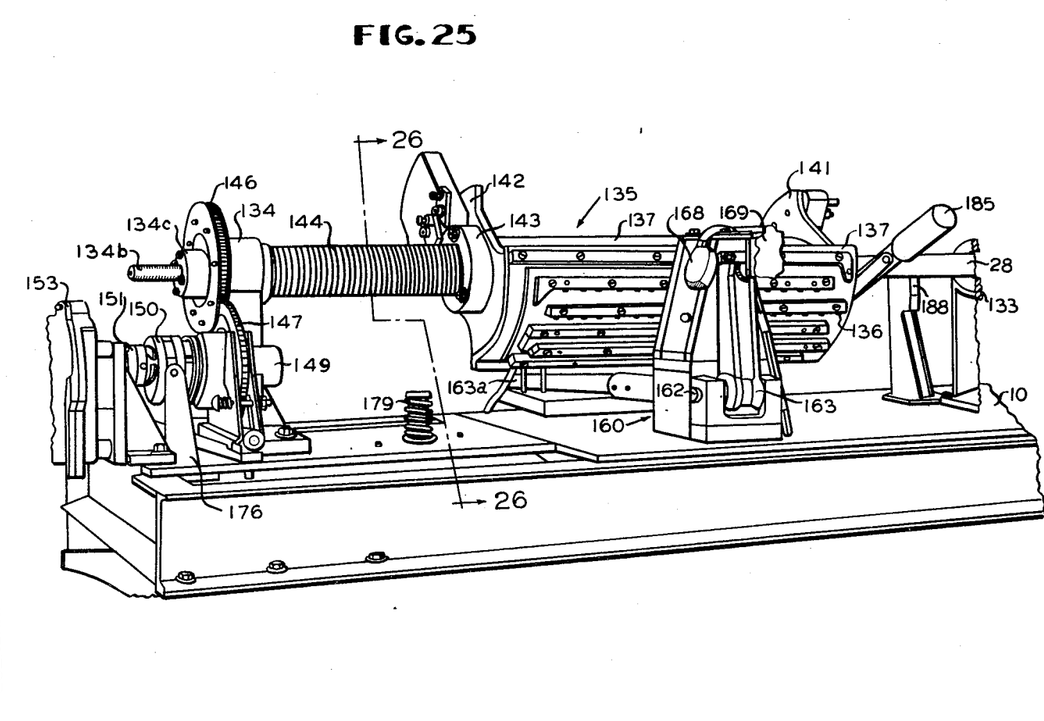
Fig. 25 is a pictorial elevational view of the "indexing" or drive end of the machine.

Main shaft 28 (Fig. 4) of the machine, on which head stock 20 of the brush clamping assembly 18 is fastened extends through bearing support 133 and terminates within sleeve 144 in bushing 134a (Fig. 3). The bushing 134a allows the shaft to slide snugly in the sleeve. A threaded stud 134b extends from main shaft 28 through bearing support 134 and a threaded collar 134c. Mounted on the main shaft is a master template assembly 135 in the face 137 (Fig. 25) of which are holes 136 of identical alignment as holes 30 in brush back 29.

Main shaft 28 (Fig. 4) has a long keyway 138 grooved in it (Fig. 4). A feather key 139 keys a a bearing 140, on the end portion 141 of master template assembly 135 to shaft 28. Feather key 139 rides in keyway 138 in the longitudinal movement of the template. On the other end, 142 (Figs. 3 and 25) of the template assembly, is a collar 143 threaded to receive an externally threaded sleeve 144 which concentrically fits around main shaft 28. Sleeve 144 is threaded its full length and extends through collar 143 a short distance as shown in Fig. 3 even when the template has reached its maximum longitudinal travel at point 145 (Fig. 4). Sleeve 144 is attached to and rotated by gear 146 (Fig. 3), driven by meshing gear 147. Gear 147 is attached to shaft 148, one end of which is supported in bearing 149, the other end of which is driven through clutch 150 and coupling 151 by shaft 152 of worm gear speed reducer 153. An electric motor 154 (Fig. 1) preferably of the three-phase type and reversible by crossing any pair of lead wires as by through a reversing line starter, drives shaft 155 (Fig. 3) of the worm gear speed reducer 153.

Threaded collar 134c is firmly fastened to sleeve 144, and is internally threaded to engage with the threads of stud 134b. Revolution of sleeve 144 by meshing gears 146 and 147 urges the master template 135 to move in an axial direction and simultaneously urges main shaft 28 to move in the same axial direction but at a different rate, as stud 134b and sleeve 144 are threaded so that the main shaft 28 moves in ratio with the template.

Partially supporting the suspended weight of the master template assembly 135 is roller 156 (Fig. 26) which is attached to lever 157 pivoted at 158. Roller 156 is biased against the master template assembly by spring 159 attached to the end of lever 157 and anchored to the deck of the machine.

Figure 26:
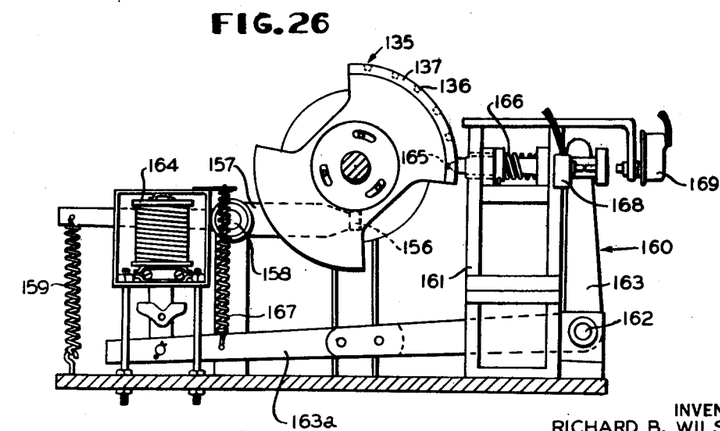
Fig. 26 is a cross sectional elevation taken on line 26—26 of Fig. 25.

An indexing pin assembly 160 has a supporting stand 161 in the base of which is a pin 162. Lever 163 pivots on pin 162. One end of lever 163 has rigidly attached to it an extension 163a connected with a solenoid 164 which when energized actuates lever arm 163 to pull indexing pin 165 out from the template. Spring 166 holds the pin 165 in the template hole. A spring 167 may be provided to assist the solenoid 164 to move the lever 163. Two micro-switches 168 and 169 are so mounted on the supporting stand 161 that movement of the pin in and out of the template alternately operates the switches. Switch 168 being operated when the pin is in, and switch 169 being operated in the out position.

Figure 27:
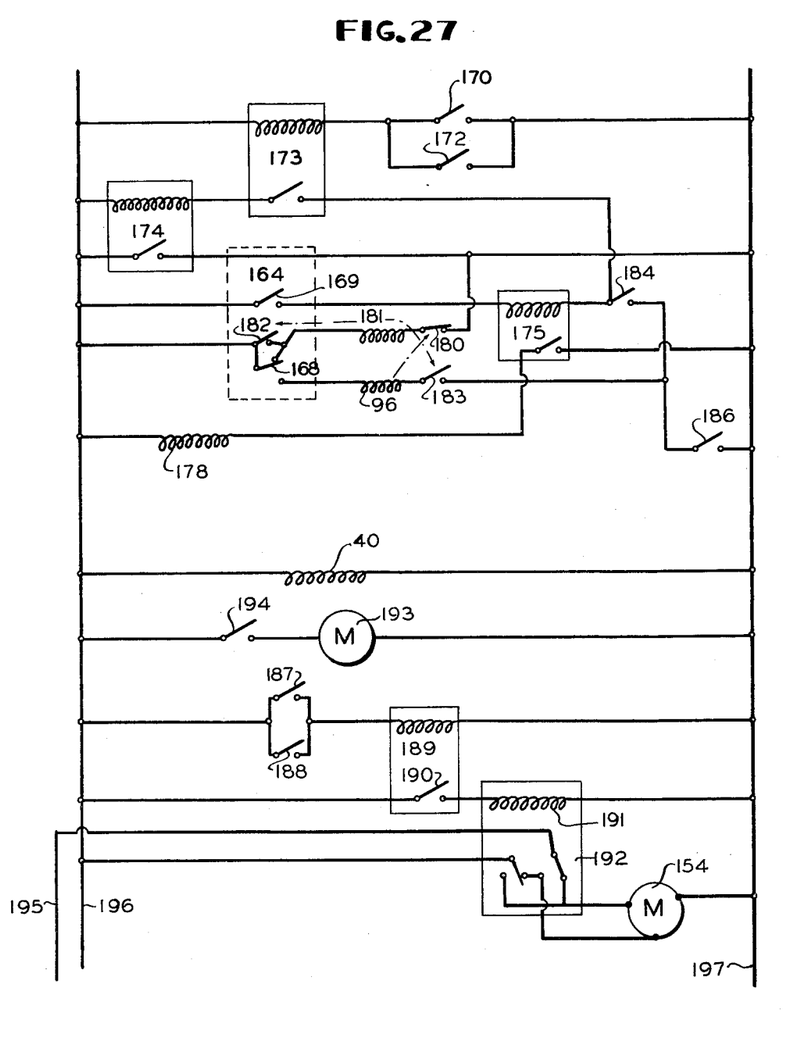
Fig. 27 is a diagram showing the interconnections between electrically operated devices on the machine.

The machine has various switches in addition to these two, the understanding of which can be had by reference to the wiring diagram of Fig. 27, other figures, however, will be mentioned to locate the switches and other electrical elements on the machine. Switch 170 is a normally open micro-switch suspended from deck 10 and closed momentarily by indexing signal cam 102 (Fig. 4) through the action of cam follower roller 171, cam 102 being on and driven by shaft 80 which also drives the needle drive cam 101 and reciprocates the needle. Closing of switch 170 occurs when the needle has completed its stroke, approximately one-half revolution of shaft 80.

Switch 172 (Fig. 1) is a manually operated normally open micro-switch located near the needle post 105. As shown in the diagram, this switch is an alternate of cam operated switch 170, either switch adapted to complete a circuit through time-delay relay coil 173.

Time-delay relay coil 173 has been found necessary as the cam 102 on the drive shaft 80 will not hold switch 170 closed long enough for the index pin to completely withdraw from the master template. Time-delay relay coil 173 holds power relay 174 closed, which in turn energizes indexing pin solenoid 164 (Fig. 26) which, as described, pulls pin 165 from the template. When pin 165 is pulled from the template it closes normally open micro-switch 169 which energizes power relay 175. Clutch 150 (see Fig. 3) through which meshing gears 146 and 147 are driven is engaged and disengaged by lever 176 pivoted at 177 and attached to and operated by clutch actuating solenoid 178. A spring 179 normally holds the clutch in the disengaged position. When power relay 175 is energized, however, clutch actuating solenoid 178 is in turn energized causing the clutch to engage and drive the master template until indexing pin 165 (Fig. 26) falls into the next template hole. Meanwhile the time-delay relay has held the index pin out a sufficient time for the template face to move under the index pin. When indexing pin 165 falls into the template hole, switch 169 opens and switch 168 closes. The opening of switch 169 causes the clutch 150 to disengage.

When the switch 168 is closed by the indexing pin 165 moving forward, it energizes solenoid 96 (Fig. 11) which lifts the pawl 95, allowing control cam 94 to operate the one-revolution clutch 93 (Fig. 4) and drive shaft 80. At the completion of the stroke of solenoid 96, normally closed micro-switch 180 (Fig. 11) is caused to open and deenergize relay 181. Denergizing relay 181 allows normally open relay contacts 182 and 183 to fall open which immediately deenergizes solenoid 96 and relay 181. Solenoid 96, however, holds the one-revolution clutch pawl 95 open long enough for the control cam 95 to start its revolution. The normally closed contact on switch 168 provides a circuit through relay coil 181. When the index pin 165 is withdrawn from the template a circuit is formed through relay coil 181 energizing the coil and closing contacts 182 and 183. Contact 183 serves as a holding contact across the normally closed contact of switch 168 so that relay 181 is energized while the index pin 165 (Fig. 26) goes into a hole in the template until switch 180 is open. The effect of relay 181 is to prevent solenoid 96 from being successively energized without the indexing pin being alternately withdrawn. This is a safety device for the needle as the needle is likely to break if caused to restitch in the same hole.

Switch 184 (Fig. 1) is a toggle type switch opened by the master template upon completing its full traverse, and when open kills all contact action through and including the clutch actuating solenoid 178 (Fig. 3). The master template must be manually moved by handle 185 (Fig. 1), to the starting position and switch 184 manually closed before a new brush can be inserted and stitched. Switch 184 is connected to switch 186 (Fig. 1) accessibly located on the deck for manual operation. Starting and stopping of the entire machine stitching and indexing control circuit is provided by switch 186. Located in back of the master template and at the extremities of its travel positions are switches 187 and 188 (Fig. 1). The momentary closing of either switch energizes the sequence relay coil 189 and with successive momentary energizations of this relay coil, relay contact 190 is alternately closed and opened. Closing of relay contact 190 energizes the indexing drive motor reversing control relay 191. Indexing drive motor 154 (Fig. 1) is reversed by crossing any pair of lead wires as is done through the reversing line starter 192 of which coil 191 is a part. The motor 193 (only shown in the diagram), to drive shaft 80 (Fig. 4), which in turn drives the needle, may be started and stopped by a manual switch 194 also accessibly located on the deck (see Fig. 1). Power line conductors 195, 196, and 197 (Fig. 1), leading from a source of electrical energy, may be channelled through a main control switch 198 which is shown in Fig. 1 but omitted from the wiring diagram.

In the practice of this invention there is provided a simple and efficiently operable brush making machine which in continuous automatic operation requiring only the manual positioning on the machine of a brush handle having tuft holes therein and the removal of the finished brush from the machine, acts otherwise automatically: (1) to separate a measured number of short bristles from a bristle holding magazine and feed them horizontally into a grooved insertion mechanism while simultaneously forming a wire loop or noose in a strand of continuous wire; (2) to then force the wire loop up through the first tuft hole in the brush handle and increase the size of the loop to readily receive a bundle of bristles which is brought forward still horizontally and inserted into the loop for a distance of one-half the length of the bundle; (3) to draw the loop tight about the middle of the bundle by holding one end of the loop secure while pulling on the other to pull the middle portion of the bundle down into the tuft hole and raise the end portions to form a tuft of bristles on the brush; and (4) then to index to the next tuft hole and repeat the same stitching operation until all of the tuft holes in the handle have been filled with tufts of bristles, and at such time to stop so the operator may cut the strand of wire, remove the finished brush and insert another brush handle.

Having fully described the invention, I claim:

1. A machine for making brushes of the wire drawn type, such machine comprising a support for the brush back with its perforations to receive the bristles, means to move said support to position such perforations successively in the same predetermined position to receive a bunch of bristles, a bin for the bristle supply, a bunch forming support at the outlet of the bin, means to intermittently feed a measured number of bristles from the bin and deposit them in a bunch on said support and at a position at one side of said predetermined position, a binding thread supply holder, a needle in the form of a tube through which a thread from such supply may pass through and out one end and be held to form successive loops when the needle is reciprocated, anchoring means beyond the exit point of the needle to hold the end of the thread, means to reciprocate the needle and form successive loops when the thread is held against movement in the needle and held by said anchoring means whereby the thread may be pushed in loop form through the brush back perforation hole in said predetermined position, said needle being mounted for its movement in line with such hole in said position, the thread supply holder being mounted to yield thread to move with the needle as the latter is moved toward such a hole, a bristle bunch clamping and feeding device to clamp one end of a bunch of bristles, said device having means to push the free end of the bunch for half the length of the bunch through a thread loop formed above the brush back hole, a holding device to prevent relative movement of the thread inside the needle as the latter is moved toward said hole to form said thread loop and to allow the thread to be pulled through the needle in restricted, limited movement when the needle is moved away from the hole whereby one side of a loop may be retracted and the loop drawn tight against the bristles to draw them into tuft formation and anchor the engaged portion of the bristles in their hole.

2. A machine for making brushes of the wire drawn type, such machine comprising a clamp support for the brush back with its perforations to receive the bristles, means to move said clamp support to position such perforations successively in the same predetermined position to receive a bunch of bristles, a magazine partitioned to hold two lengths of bristles and having an inlet and outlet to each partition, a rotary device at each outlet having a cylinder with grooves in raised portions thereon to pick a predetermined number of bristles from its magazine partition and a reciprocating trough at one side of said predetermined position to collect the bristles picked by each rotary device, a binding thread supply holder, a needle in the form of a tube through which a thread from such supply may pass through and out one end and be held to form successive loops when the needle is reciprocated, anchoring means beyond the exit point of the needle to hold the end of the thread, means to reciprocate the needle and form successive loops when the thread is held against movement in the needle and held by said anchoring means whereby the thread may be pushed in loop form through the brush back perforation hole in said predetermined position, said needle being mounted for its movement in line with such hole in said position, the thread supply holder being mounted to yield thread to move with the needle as the latter is moved toward such a hole, a bristle bunch clamping and feeding device to clamp a bristle bunch in said trough, said device having means to push the free end of the bunch of bristles through a thread loop formed by the needle above the brush back hole to half the length of the bristle bunch, yieldable means projecting into the needle tube to prevent relative movement of the thread inside the needle as the latter is moved toward said hole to form said thread loop and to allow the thread to be pulled through the needle in restricted, limited movement when the needle is moved away from the hole, whereby one side of a loop may be retracted to draw the loop tight against the bristles and draw the bristles into tuft formation and anchor their loop engaged portions in the hole, and means to release the bristle bunch clamp on the retracting backstroke of said reciprocating trough after said loop engages the center of the bristle bunch.

3. A machine for making brushes of the wire drawn type, such machine comprising a support for the brush back with its perforations to receive the bristles, said support being movable to position such perforations successively in the same predetermined position to receive a bunch of bristles, a bin for the bristle supply, a bunch forming support at the outlet of the bin, means to intermittently feed a measured number of bristles from the bin and deposit them in a bunch on said support and at a position at one side of said predetermined position, a binding thread supply holder, a needle in the form of a tube through which a thread from such supply may pass through and out one end and be held to form successive loops when the needle is reciprocated, a stationary post with a bore therein to guide the needle, means on the needle post to secure the free end of the thread issuing from the needle, means to reciprocate the needle in the post and form successive loops when the thread is so held in the needle and the free end so anchored outside whereby the thread may be pushed in loop form through the brush back perforation hole in said predetermined position, said needle being mounted for its movement in line with such hole in said position, the thread supply holder being mounted to yield thread to move with the needle as the latter is moved toward such a hole, a bristle bunch clamping and feeding device to clamp one end of a bunch of bristles, said device having means to push the free end of the bunch through a thread loop formed by the needle above the brush back hole for half the length of the bunch, a holding device to prevent relative movement of the thread inside the needle as the latter is moved toward said hole to form said thread loop said holding device having means to allow the thread to be pulled through the needle in restricted, limited movement when the needle is moved away from the hole, and means to release the bristle clamping device and retract the feeding device after said needle has drawn the loop tight against the bristles and drawn the bristle bunch into tuft formation and anchored it in the hole.

4. A machine for making brushes of the wire drawn type, such machine comprising a support for the brush back with its perforations to receive the bristles, said support being movable to position such perforations successively in the same predetermined position to receive a bunch of bristles, a bin for the bristle supply, a bunch forming support at the outlet of the bin, means to intermittently feed a measured number of bristles from the bin and deposit them in a bunch on said support and at a position at one side of said predetermined position, a binding thread supply holder, a needle in the form of a tube through which a thread from such supply may pass through and out one end and be held to form successive loops when the needle is reciprocated, said needle having an opening in its wall at one point to expose the bore, a pinch button projecting substantially perpendicular to said needle into said opening to slide therein and exert pressure against thread passing axially through the bore, spring biased means to force the pinch button into a pressure exerting position prohibiting movement of the binding thread in the bore, and another spring biased means to exert less pressure on the pinch button and allow movement of the binding thread in the bore, means to reciprocate the needle and form successive loops when the thread is held against movement in the needle and at an anchoring point beyond the exit point of the needle whereby the thread may be pushed in loop form through the brush back perforation hole in said predetermined position, said needle being mounted for its movement in line with such hole in said position, the thread supply holder being mounted to yield thread to move with the needle as the latter is moved toward such a hole, a bristle bunch clamping and feeding device to clamp one end of the bunch to the bunch forming support, said device having means to push the free end of the bunch through a thread loop formed by the needle above the brush back hole until half the length of the bunch extends on either side of the loop, means to release the clamp and retract the bunch forming support after the loop has been drawn tight against the bristles and the bristles drawn into tuft formation and anchored in the hole.

5. A machine for making brushes of the wire drawn type, comprising means for forming a knot of bristles, means for projecting a loop of wire through an opening in a brush back including a needle post having a needle in the form of a tube reciprocable in said post and through which said wire is passed and anchoring means at the top of said post for a free end of said wire, clamping means engaging one end of the knot of bristles, means to advance the clamp and push the knot of bristles halfway through said loop, means to release the clamp, and means to retract one side of the loop to draw the engaged portion of the bristles into the opening including wire holding means on said needle engageable by said needle post.

6. A machine for making brushes of the wire drawn type, comprising means for forming a knot of bristles, means for projecting a loop of wire through an opening in a brush back including a needle post having a needle in the form of a tube reciprocable in said post and through which said wire is passed and anchoring means at the top of said post for a free end of said wire, clamping means engaging one end of the knot of bristles, means to advance the clamp and push the knot of bristles halfway through said loop, means to release the clamp, means to retract one side of the loop to draw the engaged portion of the bristles into the opening including wire holding means on said needle engageable by said needle post, means to move the brush back lengthwise to align a second opening therein with the loop forming means, and means to rotate the brush back to align another opening therein with the loop forming means.

7. A brush making machine comprising means for forming a knot of bristles, means for projecting a loop of wire through an opening in a brush back, clamping means engaging one end of the knot of bristles halfway through said loop, means to release the clamp, means to retract one side of the loop to draw the engaged portion of the bristles into the opening, means to index a perforated brush back to successively align its openings with the loop forming means, said indexing means including a shaft, a brush back holder rigidly attached to the shaft, a threaded stud in the end of the shaft free to move the shaft axially but not to rotate it, an externally threaded sleeve concentrically mounted on the shaft having an internally threaded collar engageable with said threaded stud, a template with openings therein proportionately spaced to match those in a brush back, said template having collars at each end, said collars concentrically mounted on said shaft, one of said collars being threaded internally and engaging the threads on said threaded sleeve, the other of said collars containing means to engage the shaft for partially rotating same, means to rotate said threaded sleeve and its internally threaded collar to move the template axially on the sleeve and to move the stud and shaft proportionately in the same direction, and means to engage and disengage the template openings successively and stop and start the sleeve and collar rotating at predetermined intervals of time.

8. In a machine of the class described, a stationary needle post and a cap on the post, a reciprocable needle movable in the post, an elongated slot through the needle post cap, thread holding means on the needle, anchoring means for the free end of thread from the needle, and means to reciprocate the needle within the post and force a loop of thread up through the elongated slot in the needle post cap when the free end of the thread is held against movement, said elongated slot having a depth sufficient to guide said loop and prevent it from twisting.

9. In a machine of the class described, a bristle supply bin, bristle insertion slide ways and a reciprocable bristle slide movable in said ways, means to pick a predetermined number of bristles from the bin and deposit them in a bundle on the slide, a bristle clamp and means to move said clamp over an end of a bundle on the slide to clamp the bundle to the slide, detent means in one of the ways to prevent the slide from moving until the bundle end is clamped to it, and means to overcome said detent means and move said slide forward when said bundle end is clamped to the slide.

10. In a machine of the class described, a bristle supply bin, a reciprocable bristle insertion slide, a hinged bristle catcher gate spaced from said slide, means to pick a predetermined number of bristles from the bin and deposit them on the slide and gate, one end of a bristle being supported by the slide and the other end by the gate, means to clamp the bristle ends on the slide, means to reciprocate the slide, means to lift the bristle gate as the slide moves forward, and means to release the clamp at the end of the forward stroke of the slide.

RICHARD B. WILSON.

REFERENCES CITED

The following references are of record in the file of this patent:

UNITED STATES PATENTS

| Number | Name | Date |
|---|---|---|
| 450,863 | Gutsmuths | Apr. 21, 1891 |
| 469,479 | Kennedy | Feb. 23, 1892 |
| 759,465 | Nielson | May 10, 1904 |
| 2,378,456 | Wooster | June 19, 1945 |